(12) United States Patent
Jensen

(10) Patent No.: US 9,989,705 B2
(45) Date of Patent: Jun. 5, 2018

(54) FIBER OPTIC DISTRIBUTION NETWORK EMPLOYING FIBER OPTIC DISTRIBUTION ASSEMBLIES OF THE SAME TYPE, AND RELATED DEVICES, COMPONENTS, AND METHODS

(71) Applicant: Corning Optical Communications LLC, Hickory, NC (US)

(72) Inventor: Joseph Clinton Jensen, Lawndale, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days. days.

(21) Appl. No.: 15/715,201

(22) Filed: Sep. 26, 2017

(65) Prior Publication Data

US 2018/0128982 A1 May 10, 2018

Related U.S. Application Data

(60) Provisional application No. 62/417,657, filed on Nov. 4, 2016.

(51) Int. Cl.
*G02B 6/28* (2006.01)
*G02B 6/44* (2006.01)
*G02B 6/12* (2006.01)

(52) U.S. Cl.
CPC ......... *G02B 6/2808* (2013.01); *G02B 6/4446* (2013.01); *G02B 2006/12166* (2013.01)

(58) Field of Classification Search
CPC ............... G02B 6/2808; G02B 6/4446; G02B 2006/12166; G02B 6/4441; G02B 6/4452; G02B 6/4453
See application file for complete search history.

(56) References Cited

U.S. PATENT DOCUMENTS

| | | | |
|---|---|---|---|
| 9,207,421 B2 | 12/2015 | Conner | |
| 9,482,840 B2 * | 11/2016 | Conner | G02B 6/4475 |
| 9,766,414 B2 | 9/2017 | Marcouiller et al. | |
| 9,874,713 B2 * | 1/2018 | Marcouiller | G02B 6/4471 |
| 2016/0097909 A1 | 4/2016 | Loeffelholz et al. | |
| 2016/0178857 A1 | 6/2016 | Leoffelholz | |

* cited by examiner

*Primary Examiner* — John M Bedtelyon

(57) ABSTRACT

A fiber optic distribution assembly includes a plurality of fiber optic connectors, each having a plurality of ports arranged in the same predetermined port configuration. The predetermined port configuration has a plurality of port positions. Each of a group of N first optical fibers is optically connected to a first (e.g., input) fiber optic connector at port positions 1 through N of the predetermined port configuration, to support a group of N drop connections. A plurality of M second optical fibers is connected between ports (N+1) through (M+N) of the first fiber optic connector and ports 1 through M of a second (e.g., lateral) fiber optic connector. A plurality of P third optical fibers is connected between ports (M+N+1) through (M+N+P) of the first fiber optic connector and ports 1 through P of a third (e.g., distribution) fiber optic connector.

20 Claims, 10 Drawing Sheets

FIBER OPTIC DISTRIBUTION NETWORK EMPLOYING FIBER OPTIC DISTRIBUTION ASSEMBLIES OF THE SAME TYPE, AND RELATED DEVICES, COMPONENTS, AND METHODS

CROSS REFERENCE TO RELATED APPLICATIONS

This application claims the benefit of priority of U.S. Provisional Application Ser. No. 62/417,657, filed Nov. 4, 2016, the content of which is relied upon and incorporated herein by reference in its entirety.

BACKGROUND

The disclosure generally relates to a fiber optic distribution network, and more particularly to a fiber optic distribution network employing fiber optic distribution assemblies of the same type, and related devices, components, and methods.

Optical fiber is increasingly being used for a variety of broadband applications including voice, video and data transmissions. As a result of the ever-increasing demand for broadband communications, telecommunication and cable media service providers and/or operators are expanding their fiber optic networks to increase their networks' capacity and reach to provide more services, applications and information to more proximate and distant subscribers. To facilitate this capacity and reach, the fiber optic networks must employ additional fiber optic cable, hardware and components resulting in increased installation time, cost and maintenance. This results in the fiber optic networks becoming more complex, requiring architectures that allow for the most efficient delivery of fiber optic service to the subscriber. These architectures typically employ fiber optic network devices, such as fiber optic connection terminals, for example, in branches of the fiber optic network. The fiber optic network devices act to optically interconnect the fiber optic cables of the branch, separate or combine optical fibers in multi-fiber cables, and/or split or couple optical signals, as may be necessary.

For example, a multi-fiber feeder cable from a central office or a transport cable from a head end may connect to multiple multi-fiber distribution cables. Each distribution cable then may extend to a designated geographic area, thereby providing the optical service to subscribers in that area. A fiber optic drop cable from the subscriber premises may connect to the distribution cable to establish optical connectivity between the service provider and the subscriber in a fiber to the premises (FTTP), fiber-to-the-home (FTTH), or other type of fiber optic network (generally described as FTTx). However, extending the drop cable from the subscriber premises all the way to the distribution cable may require a substantial length of drop cable resulting in extensive cost and installation time. Moreover, the cost and installation time would be increased and compounded if a separate connection to the distribution cable was needed for each drop cable. To reduce the attendant cost and timing, while still maintaining optical connectivity between the distribution cable and the drop cable, and, thereby, between the service provider and the subscriber, one or more intermediate optical connection points, between the distribution cable and the drop cable may be incorporated.

To incorporate the intermediate optical connection points, a branch of the fiber optic network off of the distribution cable is established. The branch may be established at a branching point on the distribution cable, such as at a mid-span access location. A fiber optic connection terminal may be used as the intermediate optical connection point and be centrally located to all of the subscribers being served by that branch. Therefore, the drop cables may extend from the subscriber premises and connect to ports on the fiber optic connection terminal instead of directly to the distribution cable. However, the fiber optic connection terminals typically are configured for and adapted to optically interconnect to the distribution cable only the drop cables that are connected to that particular fiber optic connection terminal. Thus, each fiber optic connection terminal has its own dedicated sub-branch, i.e., stub cable, to provide optically connectivity with the distribution cable at the mid-span access location.

In situations where there are many subscriber premises to be served by one mid-span access location, more than one fiber optic connection terminal in the branch from that one mid-span access location may be needed. This is particularly applicable where the subscriber premises are separated by appreciable distances, for example without limitation, in rural areas. In such case, given the above-mentioned configuration of the fiber optic connection terminals and due to the dedicated branch (stub) cable, a separate branch with associated branch cable may have to be extended from the mid-span access location to each fiber optic connection terminal.

Similar to the drop cable situation, the cost of the branch cable is generally charged on a per foot installed basis. Accordingly, installing separate branch cables from one mid-span access location to each fiber optic connection terminal may be excessively costly and time consuming. In addition, different types of branching arrangements may require several different types of fiber optic connection terminals, with different port mapping schemes being used by different fiber optic connection terminals in the same distribution network. This approach has the drawback of requiring extensive pre-planning to determine the components needed at each point in the branch, and also requires providing potentially complex instructions to an installer in the field. Accordingly, there is a need for a fiber optic distribution network that uses interchangeable fiber optic connection terminals throughout the network as the FTTP optical network extends toward the subscriber premises.

No admission is made that any reference cited herein constitutes prior art. Applicant expressly reserves the right to challenge the accuracy and pertinency of any cited documents.

SUMMARY

The disclosure generally relates to a fiber optic distribution network, and more particularly to a fiber optic distribution network employing fiber optic distribution assemblies of the same type, and related devices, components, and methods. According to one embodiment, a fiber optic distribution assembly includes a plurality of fiber optic connectors, each having a plurality of ports arranged in the same predetermined port configuration. The predetermined port configuration has a plurality of port positions. Each of a group of N first optical fibers is optically connected to a first (e.g., input) fiber optic connector at port positions 1 through N of the predetermined port configuration, to support a group of N drop connections. A plurality of M second optical fibers is connected between ports (N+1) through (M+N) of the first fiber optic connector and ports 1 through M of a second (e.g., lateral) fiber optic connector. This allows the first fiber optic connector to support a drop port in each of M additional fiber optic distribution assemblies connected in series via the respective first fiber optic connectors. A plurality of P third optical fibers is connected between ports (M+N+1) through (M+N+P) of the first fiber optic connector and ports 1 through P of a third (e.g., distribution) fiber optic connector. This allows the second fiber optic connector to support a drop port in each of P additional fiber optic distribution assemblies connected in series via the respective second fiber optic connectors.

This arrangement permits a distribution network to be assembled using one type of distribution assembly interconnected by one type of branch cable. By using the above port mapping arrangement, the second (e.g., lateral) multifiber port is configured such that a plurality of fiber optic connection distribution assemblies (e.g., terminals) of the same type can be serially connected via their lateral multifiber ports in a daisy chain arrangement. This port mapping arrangement also allows a plurality of the same type of fiber optic distribution assemblies to be serially connected via their respective third (e.g., distribution) multifiber ports in a daisy chain arrangement. In this manner, a fiber optic network can be designed with a branching array of fiber optic distribution assemblies of the same type, in which every individual fiber of a main distribution cable can be connected to a drop cable at a different fiber optic distribution assembly in the fiber optic network. As a result, the design complexity of the branch is reduced, reducing component and man-hour costs, as well as simplifying the process of installing the fiber optic connection terminals in the field.

One embodiment of the disclosure relates to a fiber optic distribution assembly. The fiber optic distribution assembly comprises a first fiber optic connector having a plurality of ports arranged in a predetermined port configuration having at least five port positions. The fiber optic distribution assembly further comprises a second fiber optic connector having a plurality of ports arranged in the predetermined port configuration. The fiber optic distribution assembly further comprises a third fiber optic connector having a plurality of ports arranged in the predetermined port configuration. The fiber optic distribution assembly further comprises a first optical fiber comprising N optical fibers, each first optical fiber comprising a first end optically coupled to the first fiber optic connector at one of port positions 1 through N of the predetermined port configuration. The fiber optic distribution assembly further comprises a plurality of second optical fibers comprising M optical fibers, wherein M is equal to at least (N+1). Each second optical fiber comprises a first end optically coupled to the first fiber optic connector at one of port positions (N+1) through (N+M) of the predetermined port configuration. Each second optical fiber further comprises a second end optically coupled to the second fiber optic connector at one of port positions 1 through M of the predetermined port configuration. The fiber optic distribution assembly further comprises a plurality of third optical fibers comprising P optical fibers, wherein P is equal to at least (N+1). Each third optical fiber comprises a first end optically coupled to the first fiber optic connector at one of port positions (N+M+1) through (N+M+P) of the predetermined port configuration. Each third optical fiber further comprises a second end optically coupled to the third fiber optic connector at one of port positions 1 through P of the predetermined port configuration.

An additional embodiment of the disclosure relates to a fiber optic distribution assembly. The fiber optic distribution assembly comprises an input fiber optic connector having a plurality of ports arranged in a predetermined port configuration having at least five port positions. The fiber optic distribution assembly further comprises a lateral fiber optic connector having a plurality of ports arranged in the predetermined port configuration. The fiber optic distribution assembly further comprises a distribution fiber optic connector having a plurality of ports arranged in the predetermined port configuration. The fiber optic distribution assembly further comprises a first optical fiber having a first end optically coupled to the input fiber optic connector at a first port position of the predetermined port configuration. The fiber optic distribution assembly further comprises a second optical fiber having a first end optically coupled to the input fiber optic connector at a second port position of the predetermined port configuration and a second end optically coupled to the lateral fiber optic connector at the first port position of the predetermined port configuration. The fiber optic distribution assembly further comprises a third optical fiber having a first end optically coupled to the input fiber optic connector at a third port position of the predetermined port configuration and a second end optically coupled to the lateral fiber optic connector at the second port position of the predetermined port configuration. The fiber optic distribution assembly further comprises a fourth optical fiber having a first end optically coupled to the input fiber optic connector at a fourth port position of the predetermined port configuration and a second end optically coupled to the distribution fiber optic connector at the first port position of the predetermined port configuration. The fiber optic distribution assembly further comprises a fifth optical fiber having a first end optically coupled to the input fiber optic connector at a fifth port position of the predetermined port configuration and a second end optically coupled to the distribution fiber optic connector at the second port position of the predetermined port configuration.

An additional embodiment of the disclosure relates to a method of assembling a fiber optic distribution assembly. The method comprises providing a first fiber optic connector having a plurality of ports arranged in a predetermined port configuration having at least five port positions. The method further comprises optically coupling a first end of each of N first optical fibers to one of port positions 1 through N of predetermined port configuration of the first fiber optic connector, wherein N is equal to one or more. The method further comprises optically coupling a first end of each of a plurality of M second optical fibers to one of port positions (N+1) through (N+M) of the predetermined port configuration of the first fiber optic connector, wherein M is equal to at least (N+1). The method further comprises optically coupling a first end of each of the plurality of P third optical fibers to one of port positions (N+M+1) through (N+M+P) of the predetermined port configuration of the first fiber optic connector, wherein P is equal to at least (N+1). The method further comprises providing a second fiber optic connector having a plurality of ports arranged in the predetermined port configuration. The method further comprises optically coupling a second end of each of the plurality of M second optical fibers to one of port positions 1 through M of the predetermined port configuration of the second fiber optic connector. The method further comprises providing a third fiber optic connector having a plurality of ports arranged in the predetermined port configuration. The method further comprises optically coupling a second end of each of the plurality of P third optical fibers to one of port positions 1 through P of the predetermined port configuration of the third fiber optic connector.

An additional embodiment of the disclosure relates a network system for a fiber optic distribution network. The network system comprises a plurality of fiber optic distribution assemblies. Each fiber optic distribution assembly comprises a first fiber optic connector having a plurality of ports arranged in a predetermined port configuration having at least five port positions. Each fiber optic distribution assembly further comprises a second fiber optic connector having a plurality of ports arranged in the predetermined port configuration. Each fiber optic distribution assembly further comprises a third fiber optic connector having a plurality of ports arranged in the predetermined port configuration. The plurality of fiber optic distribution assemblies comprises a first fiber optic distribution assembly optically coupled to a distribution cable via the first multifiber connector of the first fiber optic distribution assembly. The plurality of fiber optic distribution assemblies further comprises a second fiber optic distribution assembly optically coupled to the second multifiber connector of the first fiber optic distribution assembly via the first multifiber connector of the second fiber optic distribution assembly. The plurality of fiber optic distribution assemblies further comprises a third fiber optic distribution assembly optically coupled to the second multifiber connector of the second fiber optic distribution assembly via the first multifiber connector of the third fiber optic distribution assembly. The plurality of fiber optic distribution assemblies further comprises a fourth fiber optic distribution assembly optically coupled to the third multifiber connector of the first fiber optic distribution assembly via the first multifiber connector of the fourth fiber optic distribution assembly. The plurality of fiber optic distribution assemblies further comprises a fifth fiber optic distribution assembly optically coupled to the fourth multifiber connector of the first fiber optic distribution assembly via the first multifiber connector of the fifth fiber optic distribution assembly.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

The disclosure generally relates to a fiber optic distribution network, and more particularly to a fiber optic distribution network employing fiber optic distribution assemblies of the same type, and related devices, components, and methods. According to one embodiment, a fiber optic distribution assembly includes a plurality of fiber optic connectors, each having a plurality of ports arranged in the same predetermined port configuration. The predetermined port configuration has a plurality of port positions. Each of a group of N first optical fibers is optically connected to a first (e.g., input) fiber optic connector at port positions 1 through N of the predetermined port configuration, to support a group of N drop connections. A plurality of M second optical fibers is connected between ports (N+1) through (M+N) of the first fiber optic connector and ports 1 through M of a second (e.g., lateral) fiber optic connector. This allows the first fiber optic connector to support a drop port in each of M additional fiber optic distribution assemblies connected in series via the respective first fiber optic connectors. A plurality of P third optical fibers is connected between ports (M+N+1) through (M+N+P) of the first fiber optic connector and ports 1 through P of a third (e.g., distribution) fiber optic connector. This allows the second fiber optic connector to support a drop port in each of P additional fiber optic distribution assemblies connected in series via the respective second fiber optic connectors.

This arrangement permits a distribution network to be assembled using one type of distribution assembly interconnected by one type of branch cable. By using the above port mapping arrangement, the second (e.g., lateral) multifiber port is configured such that a plurality of fiber optic connection distribution assemblies (e.g., terminals) of the same type can be serially connected via their lateral multifiber ports in a daisy chain arrangement. This port mapping arrangement also allows a plurality of the same type of fiber optic distribution assemblies to be serially connected via their respective third (e.g., distribution) multifiber ports in a daisy chain arrangement. In this manner, a fiber optic network can be designed with a branching array of fiber optic distribution assemblies of the same type, in which every individual fiber of a main distribution cable can be connected to a drop cable at a different fiber optic distribution assembly in the fiber optic network. As a result, the design complexity of the branch is reduced, reducing component and man-hour costs, as well as simplifying the process of installing the fiber optic connection terminals in the field.

Various embodiments will be further clarified by the following examples.

Figure 1:
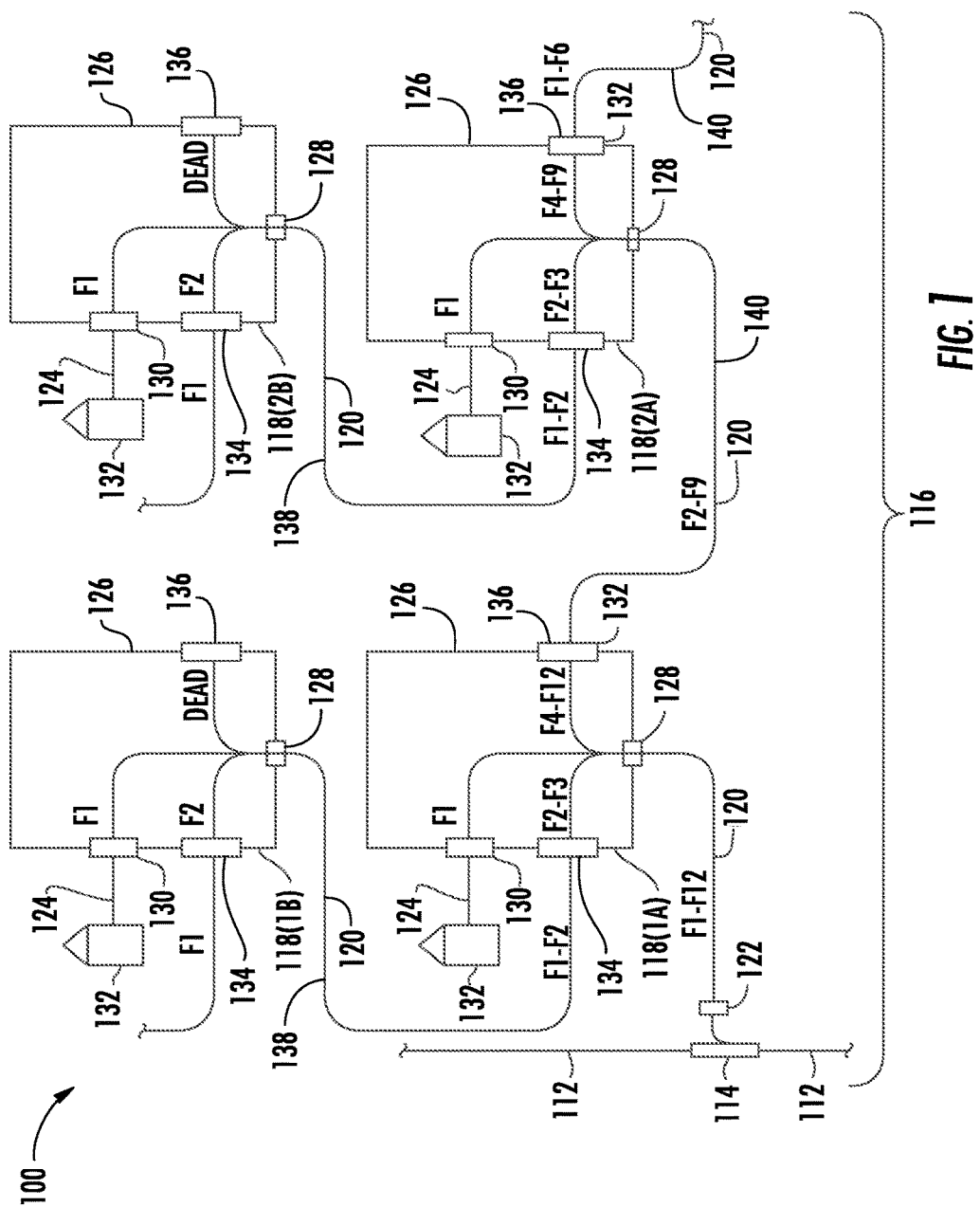
FIG. 1 is a schematic diagram of a portion of an exemplary fiber optic network that includes a distribution cable having a mid-span access location serving as a branching point for a branch comprising multiple fiber optic connection terminals of which two are shown.

In this regard, FIG. 1 illustrates a portion of a fiber optic network 100 employing fiber optic distribution assemblies (described in detail below) of the same type, according to an embodiment. The illustrated portion of the fiber optic network 100 may be at any point in the fiber optic network 100, near to or distant from the central office or head end (not shown). The fiber optic network comprises a fiber optic distribution cable 112, a mid-span access location 114, and multiple fiber optic connection terminals 118, only four of which are shown. The mid-span access location 114 provides a branch point for branch 116. A plurality of fiber optic connection terminals 118 are interconnected via a plurality of branch cables 120, which are connected, directly or indirectly, to the fiber optic distribution cable 112 through a network connector 122. One or more drop cables 124 may extend from the housing 126 of one or more fiber optic connection terminals 118. In this embodiment, each housing 126 includes a branch cable opening 128, which may also be referred to herein as a branch cable port, for receiving an upstream branch cable 120, and one or more drop ports 130. In this embodiment drop cables 124 may extend from the drop ports 130 to provide service to one or more subscriber premises 132. In this manner, branch cable 120 provides optical communication between the fiber optic distribution cable 112 and the subscriber premises 132 through the fiber optic connection terminals 118.

In this embodiment, the housing 126 of each fiber optic connection terminal 118 further includes a lateral multifiber port 134 and an expansion multifiber port 136 for connecting additional fiber optic connection terminals 118 to the branch 116. The lateral multifiber port 134 is configured such that a plurality of fiber optic connection terminals 118 of the same type can be connected in a daisy chain arrangement, and the expansion multifiber port 136 is also configured such that a plurality of the same type of fiber optic connection terminals 118 can be connected in a daisy chain arrangement.

In this manner, a fiber optic network 100 can be designed such that every individual fiber of the fiber optic distribution cable 112 can be connected to a drop cable 124 at a different fiber optic connection terminal 118, using only one type of fiber optic connection terminal 118. By using a branching array of fiber optic distribution assemblies 118 of the same type, the design complexity of the branch 116 is reduced, thereby reducing component and man-hour costs, as well as simplifying the process of installing the fiber optic connection terminals 118 in the field.

With continuing reference to FIG. 1, each branch cable 120 comprises optical fibers designated by the letter "F." In this example, each branch cable 120 has twelve optical fibers F1-F12, but it should be understood that any branch cables 120 having more or fewer optical fibers may also be used. A segment of the branch cable 120 is shown extending from the fiber optic distribution cable 112 at mid-span access location 114 to a fiber optic connection terminal 118(1A).

The fiber optic connection terminals 118 are each configured with a common port mapping scheme. The port mapping scheme predetermines the routing and optical coupling of the optical fibers in the branch cable 120 via the drop port 130, the lateral multifiber port 134, the expansion multifiber port 136, another component, another connector (not shown), and/or the like in the fiber optic connection terminal 118. The port mapping scheme of the fiber optic connection terminals 118 serves to predetermine the routing and optical coupling of optical fibers F1-F12 for each of the fiber optic connection terminals 118. In other words, the port mapping scheme predetermines the routing and optical coupling not only of the fiber optic distribution cable 112 and the drop cable 124 extending from the drop port 130 of the first fiber optic connection terminal 118, but also of the fiber optic distribution cable 112 and the drop cable 124 extending from the drop port 130 of the other fiber optic connection terminals 118 in the branch 116. The port mapping scheme also predetermines the optical coupling of the fiber optic distribution cable 112 and the drop cable 124 extending from the drop port 130 of the second fiber optic connection terminal 118 through the lateral multifiber port 134 and the expansion multifiber port 136 of each fiber optic connection terminal 118. Further, a branch cable 120 comprising optical fibers F1-F12 may extend from either of the lateral multifiber port 134 or the expansion multifiber port 136 to another successive downstream fiber optic connection terminal 118 in the branch 116. In this manner, the port mapping scheme predetermines the optical coupling between the fiber optic distribution cable 112 and the drop ports 130 of the fiber optic connection terminals 118 in the branch 116.

In this embodiment, the port mapping scheme of the fiber optic connection terminal 118(1A) routes optical fiber F1 to a drop port 130, to provide service to one or more subscriber premises 132. Optical fibers F2 and F3 are routed to the lateral multifiber port 134, and are connected with optical fibers F1 and F2 of a lateral branch cable 138 of the next fiber optic connection terminal 118(1B) in the lateral-side chain. Optical fibers F4-F12 of the fiber optic connection terminal 118(1A) are routed to the expansion multifiber port 136, and are connected to optical fibers F2-F9 of an expansion branch cable 140 of the next fiber optic connection terminal 118(2A) in the distribution-side chain.

Referring now to the lateral-side chain extending from fiber optic connection terminal 118(1A), the next fiber optic connection terminal 118(1B) in the chain has the same port mapping scheme as fiber optic connection terminal 118(1A), and may be a standardized component that is interchangeable with fiber optic connection terminal 118(1A). The lateral branch cable 138 extends from the lateral multifiber port 134 of the fiber optic connection terminal 118(1A) into the downstream fiber optic connection terminal 118(1B) via the branch cable opening 128. Fibers F1-F12 of the lateral branch cable are arranged in a port mapping scheme in the fiber optic connection terminal 118(1B) that is identical to the mapping scheme in the fiber optic connection terminal 118(1B). That is, optical fiber F1 is connected to a drop port 130, optical fibers F2 and F3 are connected to the lateral multifiber port 134, and optical fibers F4-F12 are connected to the expansion multifiber port 136. Here, however, optical fibers F1 and F2 of the fiber optic connection terminal 118(1B) are the only fibers that are connected back to the fiber optic distribution cable 112, i.e., optical fibers F2 and F3 of the fiber optic distribution cable 112. The remaining fibers F3-F12 in the fiber optic connection terminal 118(1B) are "dead." Thus, as additional fiber optic connection terminals 118 are added to each lateral-side chain in this embodiment, the first fiber F1 in each fiber optic connection terminal 118 is connected to a drop port 130, and the remaining number of "live" fibers is reduced by one.

Referring now to the distribution-side chain extending from fiber optic connection terminal 118(1A), the next fiber optic connection terminal 118(2A) in the chain also has the same port mapping scheme as fiber optic connection terminal 118(1A), similar to lateral-side fiber optic connection terminal 118(1B). The lateral branch cable 138 extends from the expansion multifiber port 136 of the fiber optic connection terminal 118(1A) into the downstream fiber optic connection terminal 118(2A) via the branch cable opening 128. Optical fibers F1-F12 of the lateral branch cable are arranged in a port mapping scheme in the fiber optic connection terminal 118(2A) that is identical to the mapping scheme in the fiber optic connection terminal 118(1B). That is, optical fiber F1 is connected to a drop port 130, optical fibers F2 and F3 are connected to the lateral multifiber port 134, and optical fibers F4-F12 are connected to the expansion multifiber port 136. Here, fibers F1-F9 of the fiber optic connection terminal 118(1B) are the only fibers that are connected back to the fiber optic distribution cable 112, i.e., optical fibers F4-F12 of the distribution cable. The remaining fibers F10-F12 in the fiber optic connection terminal 118(1B) are "dead." However, this still results in live optical fibers being available at both the lateral multifiber port 134 and the expansion multifiber port 136 of the fiber optic connection terminal 118(2A). This allows another fiber optic connection terminal 118(2B) to be connected to the lateral multifiber port 134 of the fiber optic connection terminal 118(2A) to provide another lateral-side chain, and also allows another fiber optic connection terminal 118 (not shown) to be connected to the expansion multifiber port 136 of the fiber optic connection terminal 118(2A) to continue the distribution-side chain. As additional fiber optic connection terminals 118 are added to the distribution-side chain in this embodiment, the first fiber F1 in each fiber optic connection terminal 118 is connected to a drop port 130, the next two optical fibers F2 and F3 are connected to the lateral multifiber port, and the remaining number of "live" optical fibers available for connection to another fiber optic connection terminal in the distribution-side chain is reduced by three.

It should be understood the embodiment of FIG. 1 may be modified so that different port mapping schemes may also employ a different number of optical fibers connected to one or more drop ports 130, a different number of optical fibers connected to the lateral multifiber port 134, and/or a different number of optical fibers connected to the expansion multifiber port 136. In the above example, a distribution cable with twelve live optical fibers can provide a signal to the drop port 130 of up to four fiber optic connection terminals 118 connected in a distribution-side chain, with each fiber optic connection terminal 118 in the distribution-side chain providing a signal to each drop port 130 in up to two additional fiber optic connection terminals 118 in a lateral-side chain connected to the respective fiber optic connection terminal 118 in the distribution-side chain. In general, to provide at least one live signal to multiple fiber optic connection terminals 118 in a lateral-side chain and at least one fiber optic connection terminal 118 in an expansion-side chain simultaneously, the number (M) of optical fibers used by the lateral multifiber port 134 must exceed the number (N) of optical fibers connected to a drop port 130 in the fiber optic connection terminal 118, and the number (P) of optical fibers used by the expansion multifiber port 136 in the fiber optic connection terminal 118 must also exceed N. Thus, in this example, if N is 1, M must be 2 or more, and P must also be 2 or more. To provide at least one live signal to multiple fiber optic connection terminals 118 in a lateral-side chain and at least one fiber optic connection terminal 118 in an expansion-side chain simultaneously, M must exceed N, and P must exceed the sum of N and M. Thus, in this example, if N is 1, M must be 2 or more, and P must be 4 or more.

The fiber optic connection terminal 118 may also include additional optical components including, but not limited to a splitter, splice protector, WDM device, splice holder and tray, routing guide and slack storage. The port mapping scheme may predetermine the configuring of the fiber optic connection terminal with one or more of these other optical components, and/or the routing of optical fibers to and optically coupling of optical fibers with one or more of the components. As an example, an optical fiber from the branch cable 120 may optically couple to a splitter. The optical signal carried by that optical fiber may be split into multiple optical signals by the splitter. In one example, the optical fiber F1 may output from the splitter and route to one or more drop ports 130 in the fiber optic connection terminal 118.

Figure 2:
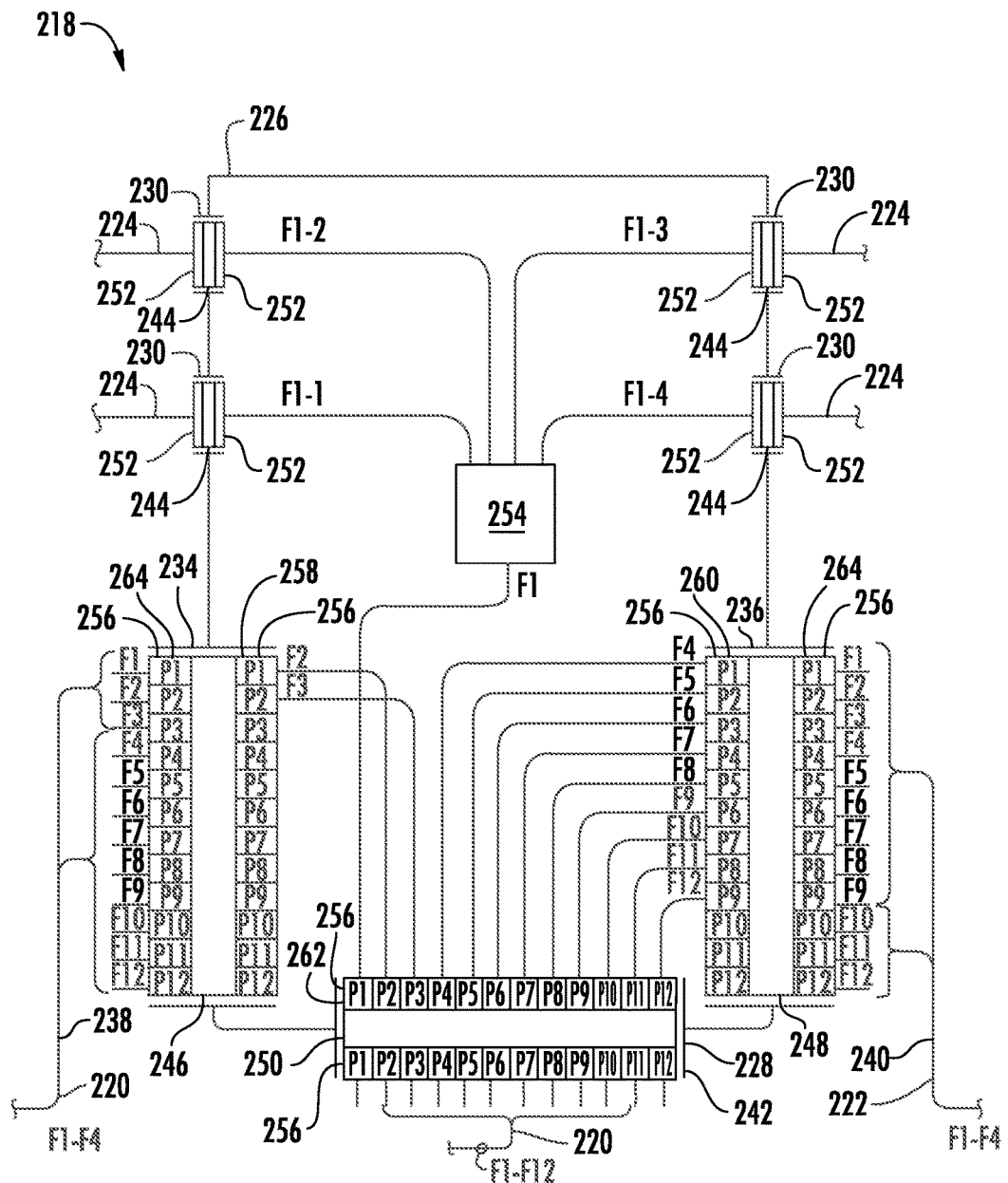
FIG. 2 is a schematic diagram of an exemplary fiber optic connection terminal comprising four drop ports and two pass-through ports operable for optically coupling predetermined ones of a plurality of optical fibers each to a drop cable based on an exemplary form of a port mapping scheme, according to an embodiment.

Referring now to FIG. 2, a more detailed schematic diagram of the fiber optic connection terminal 218 of FIG. 1 is illustrated with additional components thereof for additional exemplary discussion. In this example, the fiber optic connection terminal 218 has four drop ports 230 disposed in the housing 226. Each drop port 230 may include a fiber optic adapter 244, which may be a single fiber adapter or a multifiber adapter.

In this example, the lateral multifiber port 234 comprises a lateral multifiber adapter 246, and the expansion multifiber port 236 also comprises an expansion multifiber adapter 248 of the same type. In this embodiment, the branch cable opening 228 is an input multifiber port having an input multifiber adapter 250, but it should be understood that the branch cable opening 228 may alternatively be a pass-through opening for the branch cable 220. The lateral multifiber adapter 246 is disposed in the lateral multifiber port 234 and an expansion multifiber adapter 248 of the same type is disposed in the expansion multifiber port 236. In this example, an input multifiber adapter 250 is also disposed in the input port, i.e., the branch cable opening 228.

In this embodiment, each fiber optic adapter 244 is configured to optically couple a pair of multifiber connectors 252 to each other. In this embodiment, a splitter 254, which is a 1×4 splitter in this embodiment, is optically coupled to optical fiber F1, and outputs multiple output signals to the drop ports 230 via optical fibers F1-1, F1-2, F1-3, and F1-4. Each of the optical fibers F1-1, F1-2, F1-3, and F1-4 is terminated with multifiber connector 252, and is optically coupled to a complementary fiber optic adapter 244 connected to a respective drop cable 224.

Referring now to the lateral multifiber port 234, the lateral multifiber adapter 246 is configured to optically couple a pair of multifiber connectors 256. Each multifiber connector 256 has a plurality of ports arranged in a predetermined port configuration having twelve port positions P1-P12. It should be understood that other port configurations having a different number of ports may be used, with different limitations based on the desired layout of the network. For example, in order to provide at least one live signal to multiple fiber optic connection terminals 218 in a lateral-side chain and at least one fiber optic connection terminal 218 in an expansion-side chain simultaneously, the minimum number of port positions is five. This is because the number (M) of optical fibers used by the lateral multifiber port 234 must exceed the number (N) of optical fibers connected to a drop port 230 in the fiber optic connection terminal 218, and the number (P) of optical fibers used by the expansion multifiber port 236 in the fiber optic connection terminal 218 must also exceed N. Since the minimum number of port positions is the sum of N, M, and P, and both M and P must be at least two, the minimum number of port positions for this arrangement is five. Similarly, in order to provide at least one live signal to multiple fiber optic connection terminals 218 in a lateral-side chain and at least one fiber optic connection terminal 218 in an expansion-side chain simultaneously, M must exceed N, and P must exceed the sum of N and M. Thus, because, M must be at least two, and P must be at least four, the sum of N, M, and P must be at least seven.

Referring back to the example of FIG. 2, a lateral multifiber connector 258, which is one of the multifiber connectors 252, connects optical fibers F2 and F3 at port positions P1 and P2. Similarly, the expansion multifiber adapter 248 is configured to optically couple another pair of multifiber connectors 256, each having a plurality of ports arranged in the same predetermined port configuration having twelve port positions P1-P12. An expansion multifiber connector 260, which is one of the multifiber connectors 252, connects optical fibers F4-F9 at port positions P1-P9. In this embodiment as well, the input multifiber adapter 250 may also be configured to optically couple a pair of multifiber connectors 252, each having the same port configuration. An input multifiber connector 262, which is one of the multifiber connectors 252, connects optical fibers F1-F12 at port positions P1-P12 to act as a passthrough port for the multifiber connector 256 optically coupled to the branch cable 220.

As used herein and well known and understood in the art, the term "drop cable" shall mean and include a fiber optic cable from a subscriber premises. Also, the term "distribution cable" shall mean and include any one or more of fiber optic cables in the form of a feeder cable from a central office of a telecommunications service provider or operator, a transport cable from a head end of a cable media service provider or operator, as well as a fiber optic cable that may be optically connected to a feeder cable or a transport cable and used to further distribute the optical services toward a subscriber premises. The term "branch cable" shall mean and include any fiber optic cable, including but not limited to, a tether cable and/or a stub cable, as those terms are known in the art, and any other cable that may optically connect to and/or extend from a distribution cable for the purpose of optically connecting the distribution cable to a drop cable. The distribution cable, branch cable and/or drop cable may be any type of fiber optic cable having one or more optical fibers. The term "optical fiber" is intended to include all types of single mode and multi-mode light waveguides, including one or more bare optical fibers, loose-tube optical fibers, tight-buffered optical fibers, ribbonized optical fibers, bend insensitive optical fibers, or any other expedient of a medium for transmitting light signals.

The drop cable may be "pre-connectorized" to be readily connected to and disconnected from a drop port of the fiber optic connection terminal. At the other end, the drop cable may be optically coupled to optical fibers within a conventional closure, such as, but not limited to, a network interface device (NID) of the types available from Corning Cable Systems LLC of Hickory, N.C. In the exemplary embodiments shown and described herein, the drop cables extend from a closure located at a subscriber premises and are optically coupled through the drop ports of the fiber optic connection terminal to one or more optical fibers of a branch cable. In turn, the optical fibers of the branch cable are optically coupled to optical fibers of the distribution cable, at a mid-span access location on the distribution cable. The mid-span access location may be provided at an aerial closure, a buried closure (also referred to as a below grade closure) or an above-ground telecommunications cabinet, terminal, pedestal, or the like. Likewise, the fiber optic connection terminal may be provided at an aerial location, such as mounted to an aerial strand between utility poles or mounted on a utility pole, at a buried location, such as within a hand-hole or below grade vault, or at an above-ground location, such as within a cabinet, terminal, pedestal, above grade vault, or the like. Thus, the fiber optic connection terminal provides an accessible interconnection terminal for readily connecting, disconnecting or reconfiguring drop cables in the optical network, and in particular, for optically coupling drop cables with a distribution cable. The terms connect, interconnect, and couple shall be understood to mean, without limitation, the passage, flow, transmission, or the like of an optical signal between one or more of optical cables, optical fibers, components, and/or connectors, or the like and one or more of optical cables, optical fibers, components, and/or connectors, or the like; whether or not by direct or indirect physical connection, to establish optical communication or connectivity.

In some embodiments, a fiber optic adapter may be a hardened fiber optic adapter for connecting a hardened fiber optic connector for a distribution or branch cable, for example. As used herein, the term "hardened" in relation to a fiber optic adapter and/or fiber optic connector refers to environmentally resistant fiber optic adapters and fiber optic connectors that are configured for use in an outdoor (e.g., OSP) environment, such as, for example, Corning Optical Communications'® OptiTap®, OptiTip®, and FlexNAP™ connectivity solutions.

A branching point may be established at a mid-span access location and/or at the end of a distribution cable. For purposes herein, reference to mid-span access location shall be understood to also include the end of the distribution cable. The direction in the branch cable toward or facing the mid-span access location may be referred to as "upstream" and the direction facing away from the mid-span access location may be referred to as "downstream." It should be understood, though, that using the terms "upstream" or "downstream" does not indicate the direction in which the optical signals are transmitted or carried in the optical fibers. Thus, an optical signal may be transmitted in both the upstream or downstream direction.

Due to the port mapping scheme, more than one fiber optic connection terminal may be directly or indirectly connected in the branch. Because more than one fiber optic connection terminal may be included in the branch, distributed, and/or hierarchical architectures, including embodiments disclosed herein, may be employed to position the fiber optic connection terminals at more convenient locations with respect to the subscriber premises. As a result, drop cables extending from a subscriber premises may be optically coupled to the fiber optic network at a fiber optic connection terminal more closely located to the subscriber premises as opposed to a fiber optic connection terminal located more distantly or at the actual mid-span access location provided on the distribution cable. Thus, the overall length of the drop cables may be substantially reduced, and a greater number of subscriber premises may be serviced over a wider area.

Figure 3A:
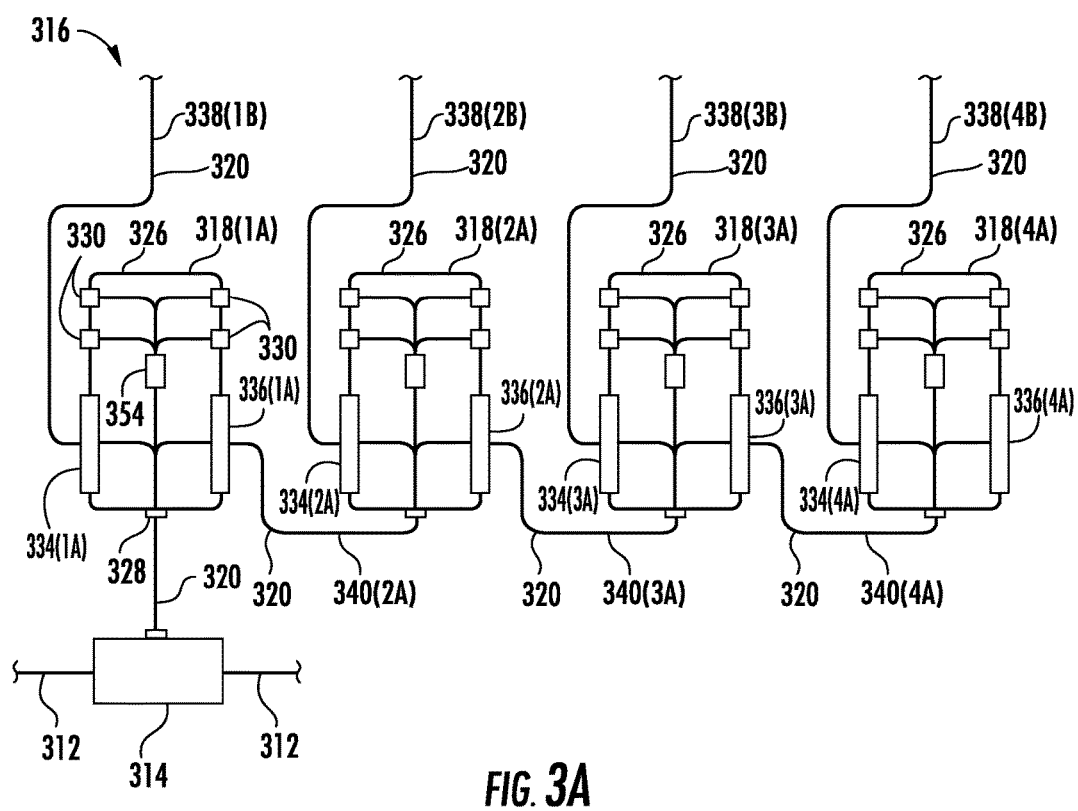
FIG. 3A is a schematic diagram of a portion of an exemplary fiber optic network similar to the fiber optic network of FIGS. 1 and 2 illustrating a full lateral-side chain of fiber optic connection terminals, according to an embodiment.

Referring back to FIG. 2, the lateral multifiber connector 258 and the expansion multifiber connector 260 have the same port configuration and are thus both configured to be optically coupled with a branch multifiber connector 264 coupled to another downstream fiber optic connection terminal 218 of the same type. In this regard, FIG. 3A illustrates a portion of a branch 316 of a network, similar to the fiber optic network 100 of FIG. 1, comprising a plurality of fiber optic connection terminals 318(1A)-318(4A) connected to a fiber optic distribution cable 312 in a distribution-side chain. In this embodiment, fiber optic connection terminal 318(A1) is connected to the fiber optic distribution cable 312 via branch cable 320 extending between the fiber optic connection terminal 318(1A) and a mid-span access location 314. In this embodiment (and in the embodiments of subsequent FIGS. 3B-4), the port mapping scheme of each of the fiber optic connection terminals 318 is the port mapping scheme illustrated in FIG. 2.

In this regard, fiber optic connection terminal 318(1A) receives optical fibers F1-F12 from branch cable 320 at the branch cable opening 328. Optical fiber F1 is split by the splitter 354 into a plurality of optical fibers connected to the plurality of drop ports 330. Optical fibers F2 and F3 are connected to ports P1 and P2 of lateral multifiber connector (not shown) at the lateral multifiber port 334(1A), which is in turn connected to lateral branch cable 338(1B) of fiber optic connection terminal 318(1B) in the lateral-side chain. The remaining nine optical fibers F4-F12 are connected to the expansion multifiber connector (not shown) at the expansion multifiber port 336(1A).

The next fiber optic connection terminal 318(2A) in the distribution-side chain is connected to the fiber optic connection terminal 318(1A) via expansion branch cable 340 (2A). Optical fiber F1 is split by the splitter 354 into a plurality of optical fibers connected to the plurality of drop ports 330, and optical fibers F2 and F3 are connected to ports P1 and P2 of the lateral multifiber connector 58 at the lateral multifiber port 334(2A). Live optical fibers F4-F9 are connected to ports P1-P6 of the expansion multifiber connector 60 at the expansion multifiber port 336(2A), and dead optical fibers F10-F12 are connected to ports P7-P9.

In this manner, each fiber optic connection terminal 318(1A)-318(4A) of the distribution-side chain routes optical fibers F1-F3 away from the respective expansion multifiber port 336, and reroutes the remaining optical fibers to port positions P1-PX of the expansion multifiber port 336. Thus, for a distribution cable with twelve optical fibers the maximum number of fiber optic connection terminals 318 in a distribution-side chain having this port mapping configuration is four, because each successive expansion multifiber port 336 has three fewer live optical fibers.

Figure 3B:
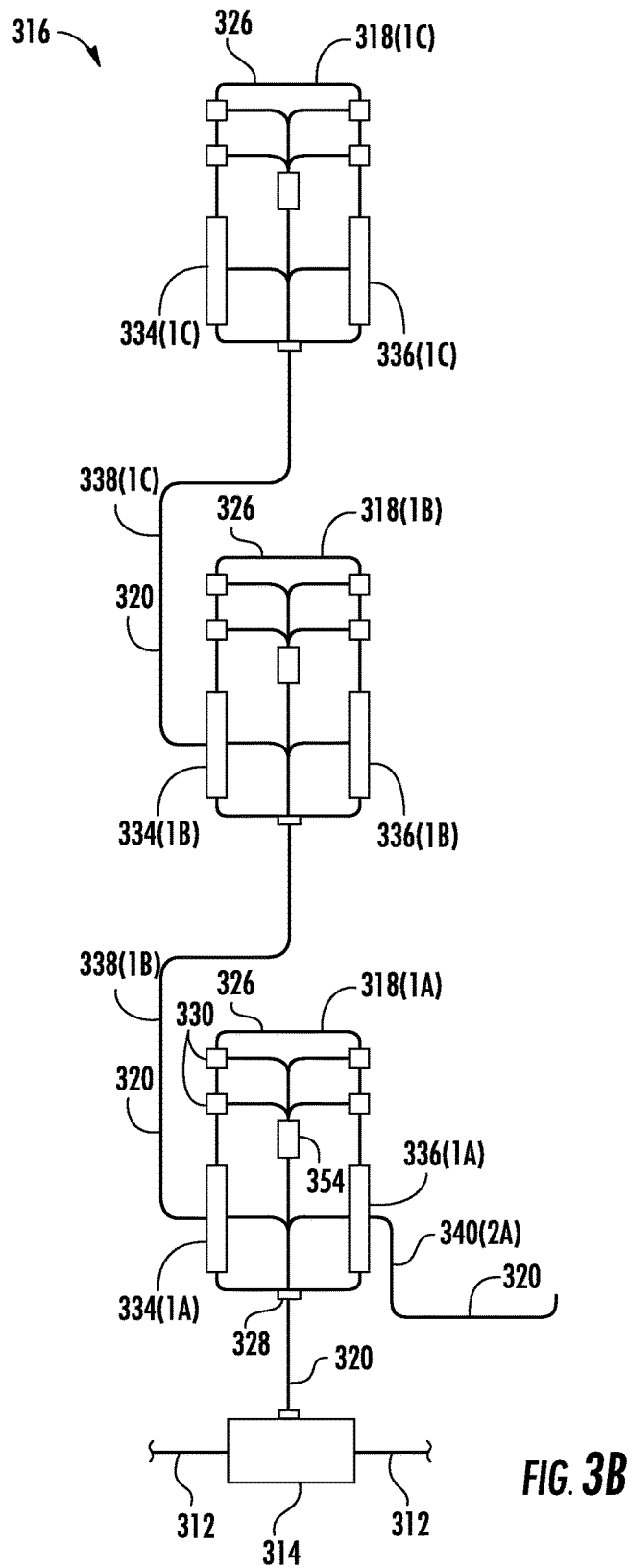
FIG. 3B is a schematic diagram of a portion of the fiber optic network of FIG. 3A illustrating a full distribution-side chain of fiber optic connection terminals, according to an embodiment.

Referring now to FIG. 3B, a portion of the branch 316 is illustrated comprising a plurality of fiber optic connection terminals 318(1A)-318(1C) connected to a fiber optic distribution cable 312 in a lateral-side chain. As discussed above, each fiber optic connection terminal 318(1A)-18(1C) of the lateral-side chain routes optical fibers F1 and F4-F12 away from the respective lateral multifiber port 334(1A)-334(1C), and reroutes the remaining optical fibers to port positions P1-PX of the expansion multifiber port 336(1A)-336(1C). Thus, for a distribution cable with twelve optical fibers the maximum number of fiber optic connection terminals 318 in a distribution-side chain having this port mapping configuration is three, because the second lateral multifiber port 334(1B) in the lateral-side chain has all but one live optical fiber (F2) routed away from the lateral multifiber port 334(1B). Live optical fiber F2 is routed to port P1 of the lateral multifiber port 334(1B), and is then routed to the drop ports 330 in the third fiber optic connection terminal 318(1C) in the lateral-side chain.

Figure 3C:
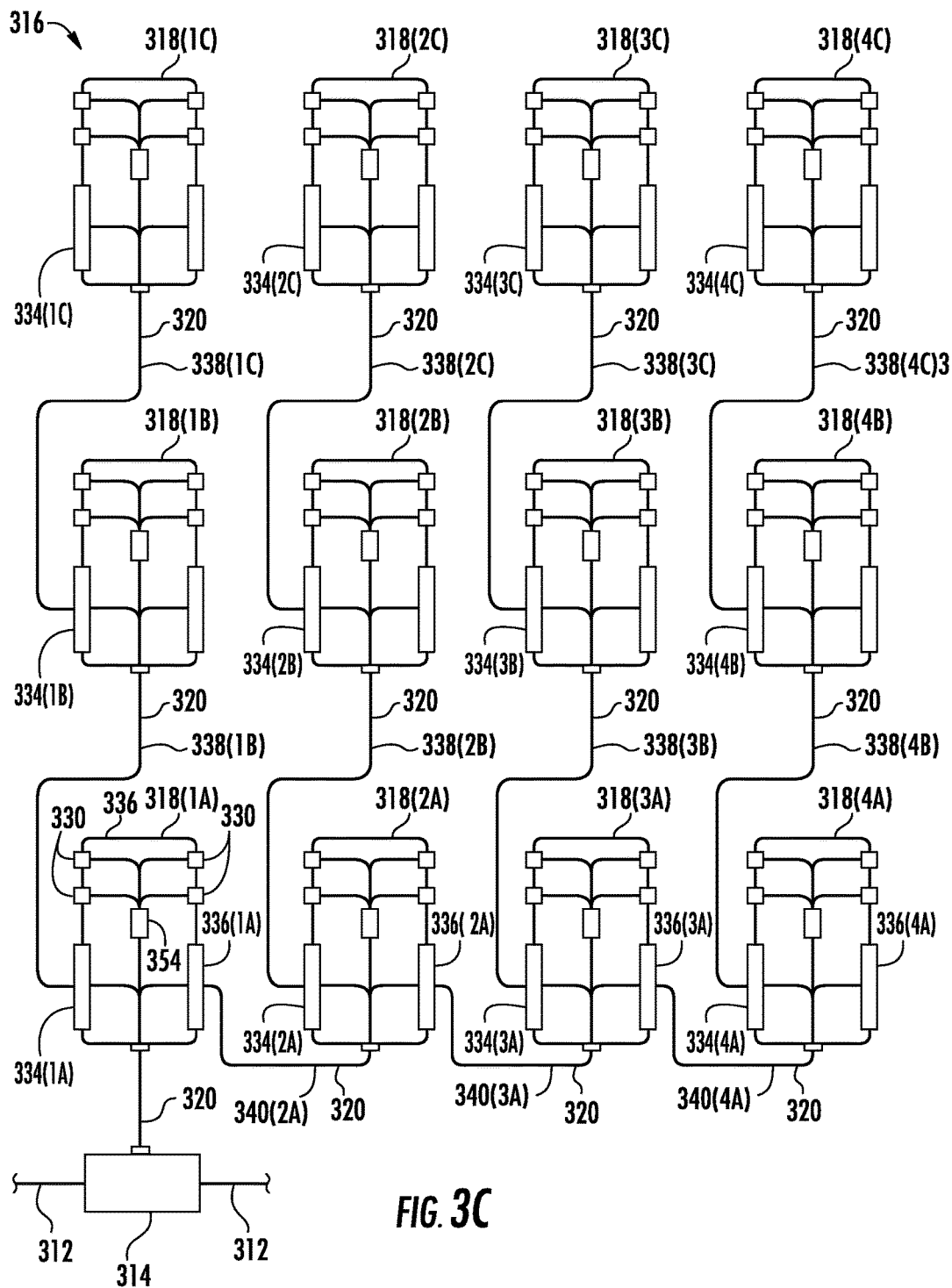
FIG. 3C is a schematic diagram of an expanded portion of the fiber optic network of FIGS. 3A and 3B illustrating the full distribution-side chain of fiber optic connection terminals, and the full lateral-side chain of fiber optic connection terminals for each terminal in the distribution-side chain.

Referring now to FIG. 3C, the complete branch 316 is illustrated. The branch 316 has four fiber optic connection terminals 318(1A)-318(4A) connected in an expansion-side chain, with each fiber optic connection terminal 318 in the expansion-side chain providing a signal to each drop port 330 in up to two additional fiber optic connection terminals 318 in a respective lateral-side chain. Each lateral-side chain is connected to the respective fiber optic connection terminal 318 in the distribution-side chain. In this regard, fiber optic connection terminal 318(1A) is connected to fiber optic connection terminals 318(1B) and fiber optic connection terminals 318(1C) in a lateral-side chain, and fiber optic connection terminal 318(2A) is connected to fiber optic connection terminals 318(2B) and fiber optic connection terminals 318(2C) in a lateral-side chain. Fiber optic connection terminal 318(3A) is connected to fiber optic connection terminals 318(3B) and fiber optic connection terminals 318(3C) in a lateral-side chain, and fiber optic connection terminal 318(4A) is connected to fiber optic connection terminals 318(4B) and fiber optic connection terminals 318(4C) in a lateral-side chain.

Figure 4:
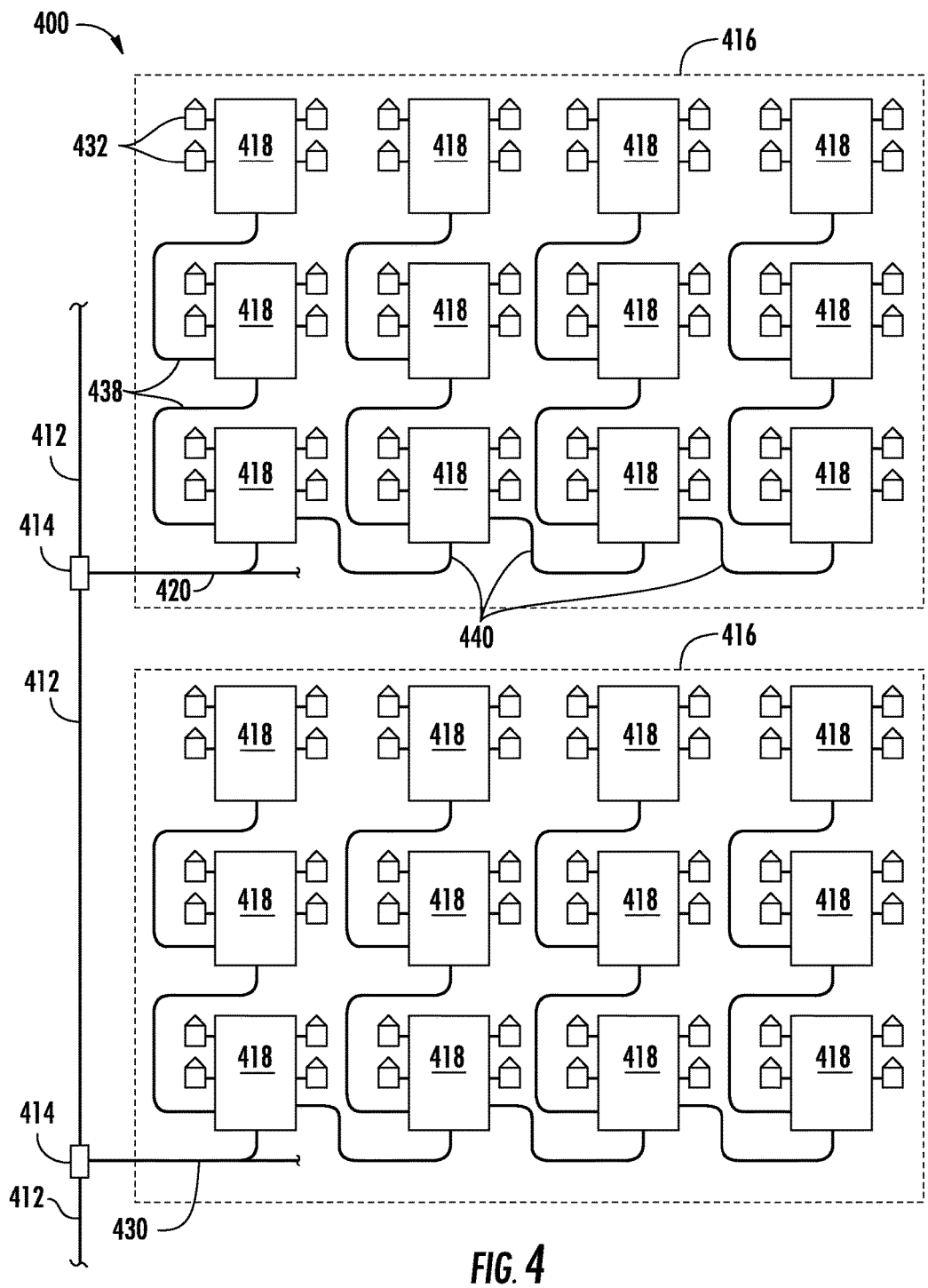
FIG. 4 is a schematic diagram of an expanded portion of an exemplary fiber optic network similar to the fiber optic network of FIGS. 1-3C, illustrating the layout of multiple branches servicing a plurality of subscriber premises.

Referring now to FIG. 4, a schematic view of a larger portion of the network 400 illustrating two fully built-out branches 416 along the main fiber optic distribution cable 412. In this example, each branch 416 supports forty-eight separate subscriber premises from a single mid-span access location 414. In this manner, the network 400 can be efficiently scaled out in stages, and in a more cost-effective manner.

Figure 5:
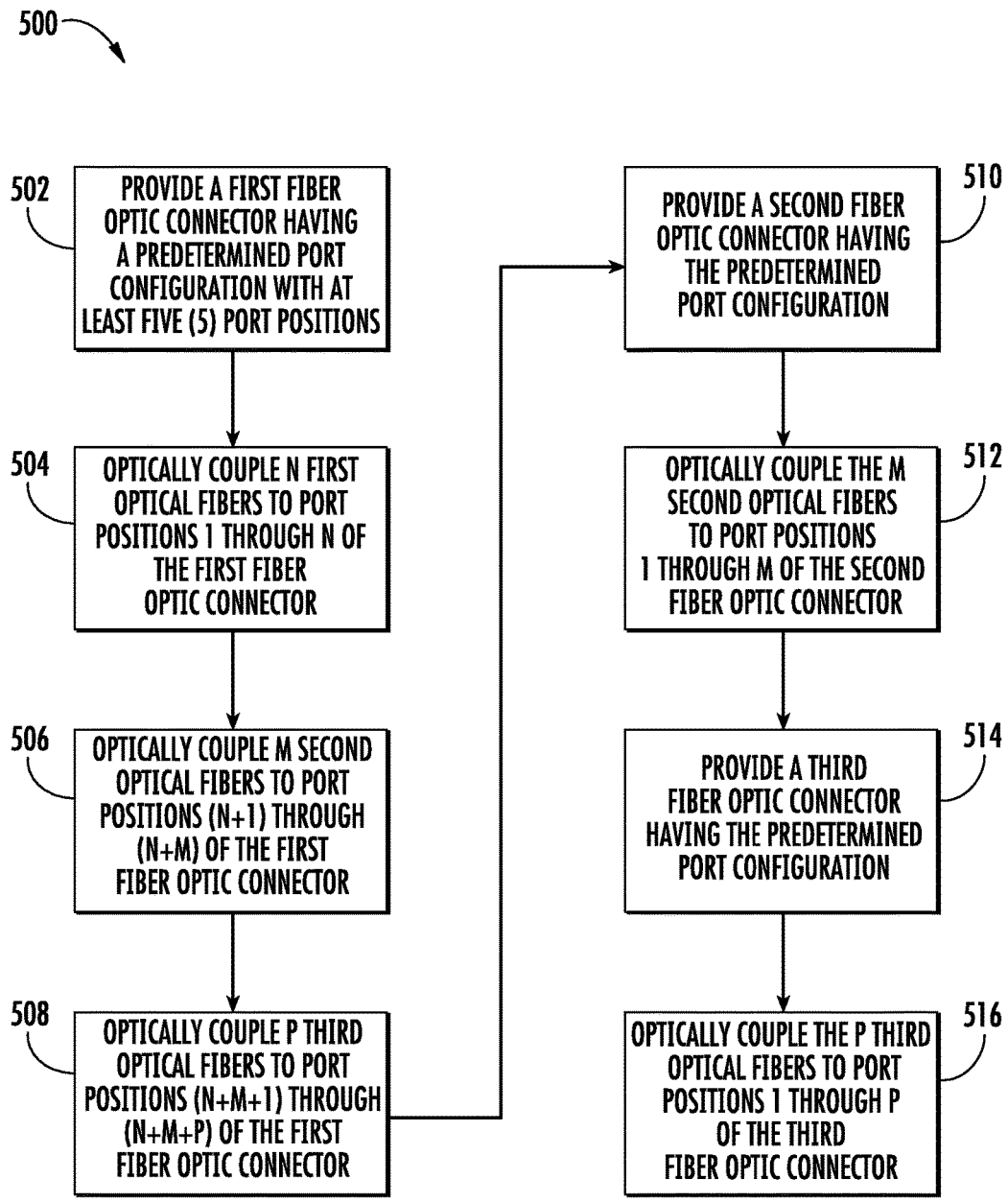
FIG. 5 is a flowchart illustrating an exemplary method of port mapping of a fiber optic network device, according to an embodiment.

FIG. 5 is a flowchart of a method 500 of assembling a fiber optic distribution, such as the fiber optic connection terminal 118, 218, 318 of FIGS. 1-4, for example, according to an embodiment. The method 500 comprises providing a first fiber optic connector, such as the input multifiber connector 262 or other multifiber connector 256 of FIG. 2, for example, having a plurality of ports arranged in a predetermined port configuration having at least five port positions (Block 502), and optically coupling a first end of each of N first optical fibers to one of port positions P1 through PN of the predetermined port configuration of the first fiber optic connector, wherein N is equal to one or more (Block 504). The method 500 further comprises optically coupling a first end of each of a plurality of M second optical fibers to one of port positions (N+1) through (N+M) of the predetermined port configuration of the first fiber optic connector, wherein M is equal to at least (N+1) (Block 506), and optically coupling a first end of each of the plurality of P third optical fibers to one of port positions (N+M+1) through (N+M+P) of the predetermined port configuration of the first fiber optic connector, wherein P is equal to at least (N+1) (Block 508). The method 500 further comprises providing a second fiber optic connector, such as the lateral multifiber connector 258 of FIG. 2, for example, having a plurality of ports arranged in the predetermined port configuration (Block 510), and optically coupling a second end of each of the plurality of M second optical fibers to one of port positions P1 through PM of the predetermined port configuration of the second fiber optic connector (Block 512). The method further comprises providing a third fiber optic connector, such as the expansion multifiber connector 260 of FIG. 2, for example, having a plurality of ports arranged in the predetermined port configuration (Block 514), and optically coupling a second end of each of the plurality of P third optical fibers to one of port positions P1 through PP of the predetermined port configuration of the third fiber optic connector (Block 516).

The fiber optic connection terminal 118, 218, 318, as well as any other fiber optic distribution assemblies disclosed herein, may be any type of fiber optic network device and, therefore, may have any structure. Accordingly, without limiting in any manner the type or structure of fiber optic network device in which the present invention may be practiced, an exemplary embodiment of a fiber optic network device in the form of a multi-port device will now be described with reference to FIGS. 6-8.

Figure 6:
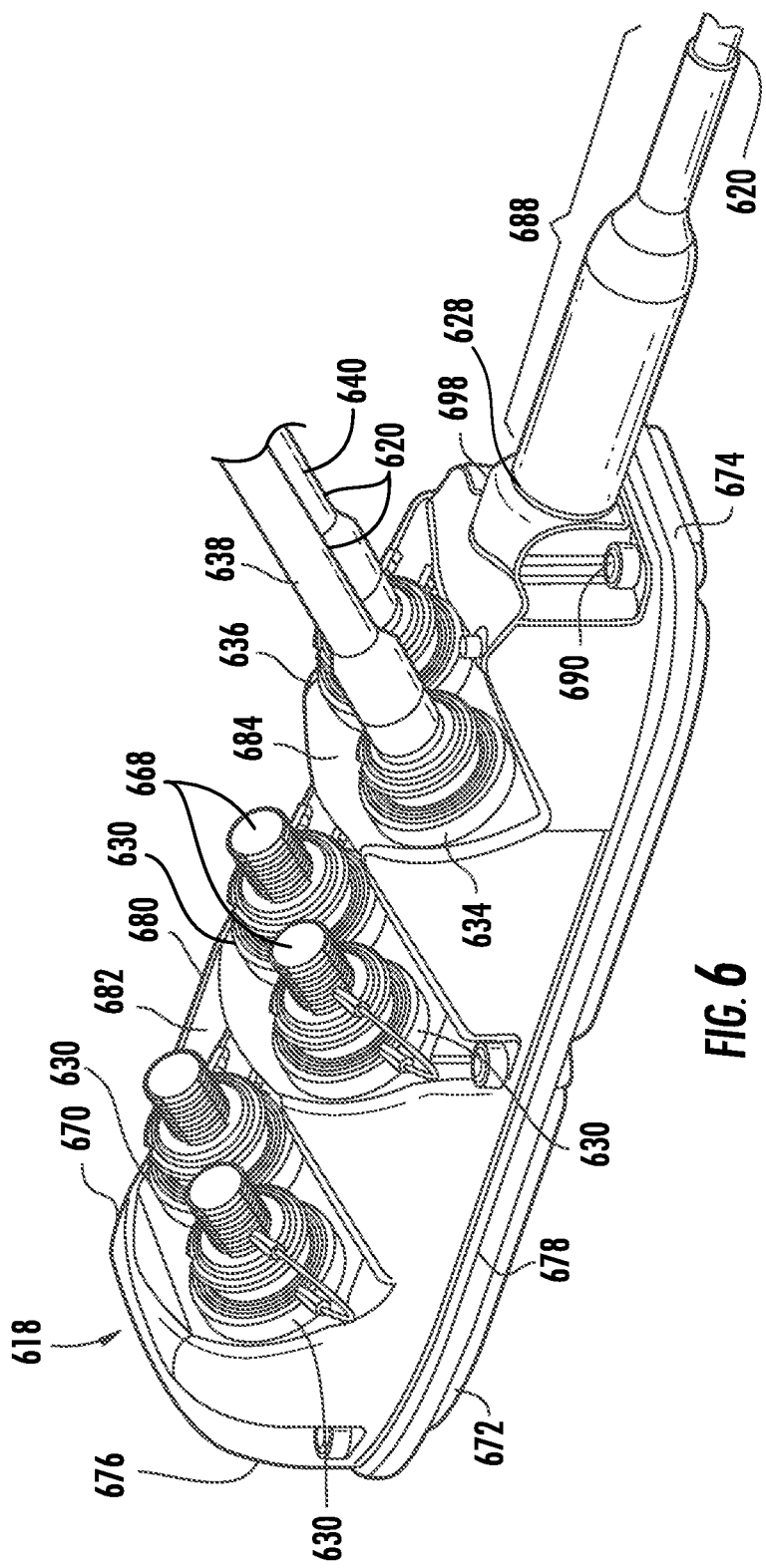
FIG. 6 is a perspective view of a structure of an exemplary fiber optic connection terminal having four ports, according to an embodiment.
Figure 7:
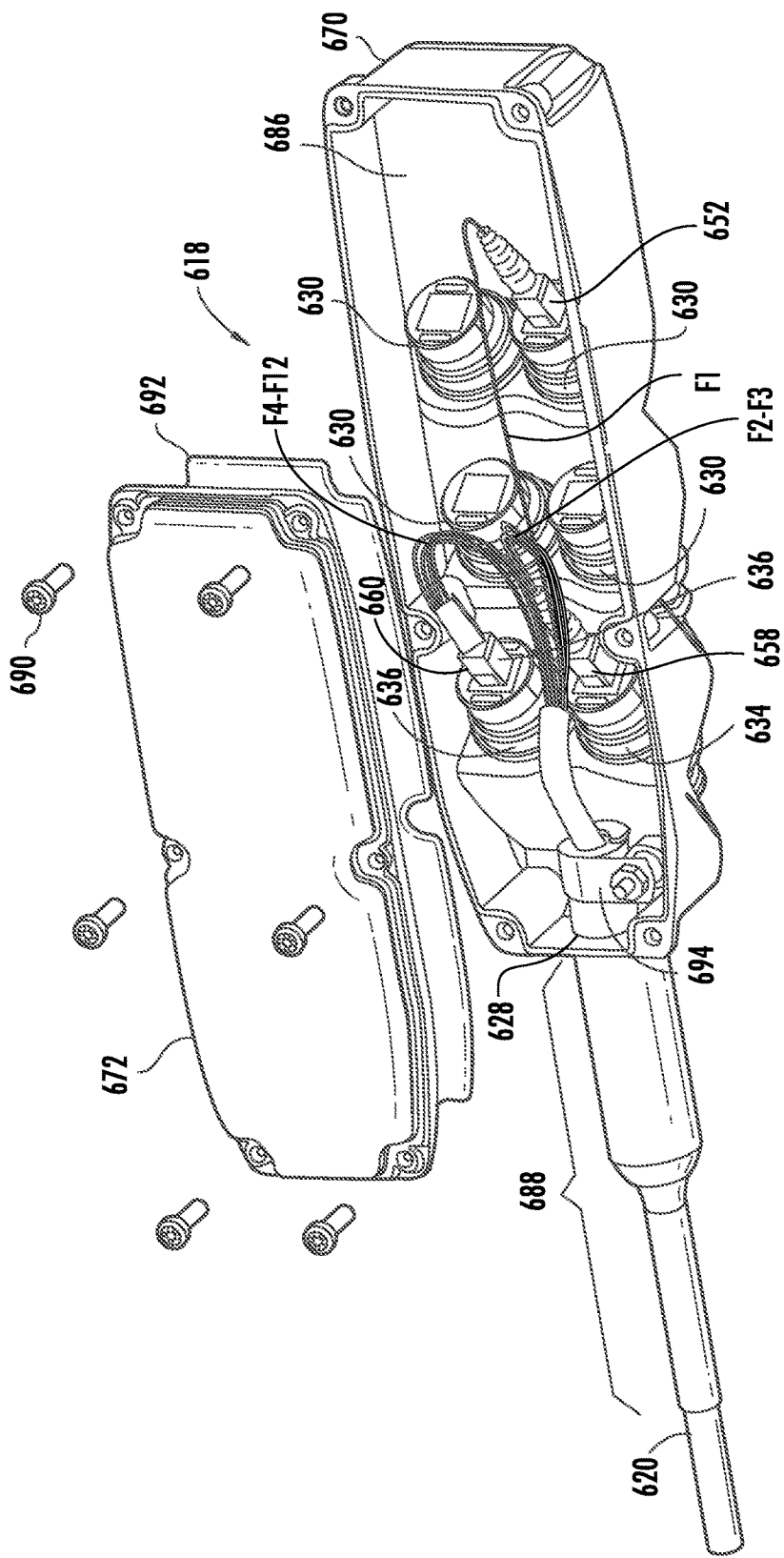
FIG. 7 is an internal perspective view of the structure of the fiber optic connection terminal of FIG. 6, illustrating the predetermined routing of optical fibers based on a port mapping scheme, according to an embodiment.

Turning now to FIGS. 6 and 7, an exemplary embodiment of a multi-port device as a fiber optic connection terminal 618 in accordance with the present invention is shown. As shown in FIG. 6, the fiber optic connection terminal 618 comprises a base 670 and a cover 672 each made of a lightweight, yet rigid material, such as plastic, thermoplastic, composite or aluminum material. The base 670 and the cover 672 define an enclosure having an exterior surface. Additionally, the base 670 has opposed end walls 674, 676 and sidewalls 678, 680, of the exterior surface. The base 670 is further provided with an upper surface 682 of the exterior surface. The upper surface 682 of the base 670 is provided with a plurality of angled or sloped surfaces 684. In this embodiment, each angled surface 684 has at least one drop port 630, at least one lateral multifiber port 634, and at least one expansion multifiber port 636 formed therethrough. Further, the base 670 is generally box-shaped and defines an interior cavity 686 for housing fiber optic hardware, such as connector ports, adapters, optical fiber routing guides, fiber hubs and the like. The base 670 may have any of a variety of shapes that is suitable for housing fiber optic hardware and for routing and connecting optical fibers of the branch cable 620, as described herein. However, by way of example only, the base 670 of this embodiment is generally rectangular and is elongated in the lengthwise direction relative to the widthwise direction between the opposed end walls 674, 676.

A branch cable opening 628 is disposed through the exterior surface. Although the branch cable opening 628 may be at any position through the exterior surface, in the embodiment shown, the branch cable opening 628 is disposed in the end wall 674 of the base 670. The branch cable opening 628 is operable for receiving a branch cable assembly 688 comprising the branch cable 620. The branch cable assembly 688 is inserted through the branch cable opening 628 of the fiber optic connection terminal 618. The end of the branch cable 620 having at least one pre-connectorized optical fiber mounted thereon is routed through the branch cable opening 628 into the interior cavity 686. The branch cable assembly 688 is any type of assembly or structure that provides for the entrance of the branch cable 620 into the fiber optic connection terminal 618, and the sealing of the branch cable 620 as it enters the fiber optic connection terminal 618. Additionally, the branch cable assembly 688 may provide strain relief to the branch cable 620 as is known in the art. Alternatively, a multi-fiber connector (not shown) may be used to connect the branch cable 620 to the fiber optic connection terminal 618. In such case, instead of the branch cable assembly 688 as depicted in FIGS. 6 and 7, the multi-fiber connector may be connected to an adapter seated within the branch cable opening 628. Another multi-fiber connector (not shown) may be used to connect to the adapter in the interior cavity 686, thereby optically connecting the optical fibers of the branch cable 620 to optical fibers disposed within the fiber optic connection terminal 618.

The cover 672 is adapted to be attached to the base 670 such that the fiber optic connection terminal 618 is re-enterable to provide ready access to the interior cavity 686, particularly in the field, if necessary to reconfigure the optical fibers of the branch cable 620 relative to the drop ports 630, the lateral multifiber port 634, and the expansion multifiber port 636. Specifically, the base 670 and cover 672 are preferably provided with a fastening mechanism 690 such as, but not limited to, clasps, fasteners, threaded bolts or screws and inserts, or other conventional means for securing the cover 672 to the base 670 in the closed configuration. However, the cover 672 may be slidably attached to the base 670 to selectively expose portions of the interior cavity 686 of the base 670 (not shown). Alternatively, the cover 672 may be hingedly attached to the base 670 at one or more hinge locations (not shown) to allow the cover 672 and base 670 to remain secured to one another in the opened configuration. A gasket 692 may be disposed between a peripheral flange provided on the base 670 and the interior of the cover 672. As shown, the gasket 692 is generally rectangular and of a size corresponding to that of the base 670 and the cover 672. Alternatively, in certain locations the service provider may determine that it is not desirable that fiber optic connection terminal 618 be enterable in the field, and, therefore, may decide to fasten the base 670 to the cover 672 by welding, for example using an epoxy type of weld.

As illustrated in FIG. 7, the branch cable 620 passes through the branch cable opening 628 and enters the fiber optic connection terminal 618. A securing mechanism 694, such as for example, a fastener, clamp and nut, bracket or clasp, is provided in the interior cavity 686 of the fiber optic connection terminal 618 to secure the branch cable 620 to the base 670. Alternatively, instead of the branch cable 620 passing through the branch cable opening 628, the branch cable 620 may have a connector on the end, which, in such case, would connect with an adapter seated in the branch cable opening 628. Also, alternatively, the optical fibers in the branch cable 620 may be spliced, for example, fusion spliced, with optical fibers in the interior cavity 686. In this embodiment, the branch cable 620 is a twelve fiber optical cable. It should be understood that the present invention is not limited to a branch cable 620 having any specific number of optical fibers. A branch cable 620 having less or more than twelve optical fibers may be used. Within the fiber optic connection terminal 618, at least one individual optical fiber of the branch cable 620 in the form of a pigtail terminates at its respective connector. The pre-connectorized optical fiber or pigtail is routed within the interior cavity 686 of the fiber optic connection terminal 618 and connects to an adapter (not shown) seated within the respective drop port 630. The optical fiber or pigtail may be pre-connectorized with any suitable connector, for example, an SC connector available from Corning Optical Communications LLC of Hickory, N.C. In FIG. 7, four pre-connectorized optical fibers are shown each connecting to the respective drop port 630. A field-connectorized or pre-connectorized drop cable 624 may be connected to the adapter seated within the drop port 630 from the exterior of the fiber optic connection terminal 618. The drop cable 624 may be connectorized or pre-connectorized with any suitable ruggedized connector, for example, an OptiTap® or OptiTip® connector available from Corning Optical Communications LLC of Hickory, N.C.

Additionally, optical fibers of the branch cable 620 may be connected to a pass-through connector, such as a lateral multifiber connector (not shown) disposed in the lateral multifiber port 634, or an expansion multifiber connector (not shown) disposed in the expansion multifiber port 636. The pass-through connector may be any type of multi-fiber connector, such as an MTP connector available from Corning Optical Communications LLC of Hickory, N.C. Alternatively, a splice, such as a fusion splice may be used instead of a pass-through connector. In this embodiment, optical fibers of the branch cable 620 are connected to the pass-through connectors as described in detail above. The pass-through connectors connect to multi-fiber adapters (not shown) seated in the lateral multifiber port 634 and the expansion multifiber port 636. A lateral branch cable 638 and an expansion branch cable 640 each extend to another fiber optic connection terminal 618, each connecting back to a network connector 622 external to branch 616 of fiber optic connection terminals 618. As described above, the network connector 622 may be any type of multi-fiber connector, such as an OptiTip® fiber optic connector. Thus, the multi-fiber adapter (not shown) may be an MTP/OptiTip® adapter to accept and connect the branch connector (not shown), an MTP connector, and the network connector 622, an OptiTip® connector. In this manner, the fiber optic connection terminal 618 may be series and/or sub-branch connected with another fiber optic connection terminal 618. In this manner, optical coupling according to a port mapping scheme may be established between certain of the optical fibers of the branch cable 620 in the interior cavity 686 and to the branch cable 120 that extends between fiber optic connection terminals.

Figure 8:
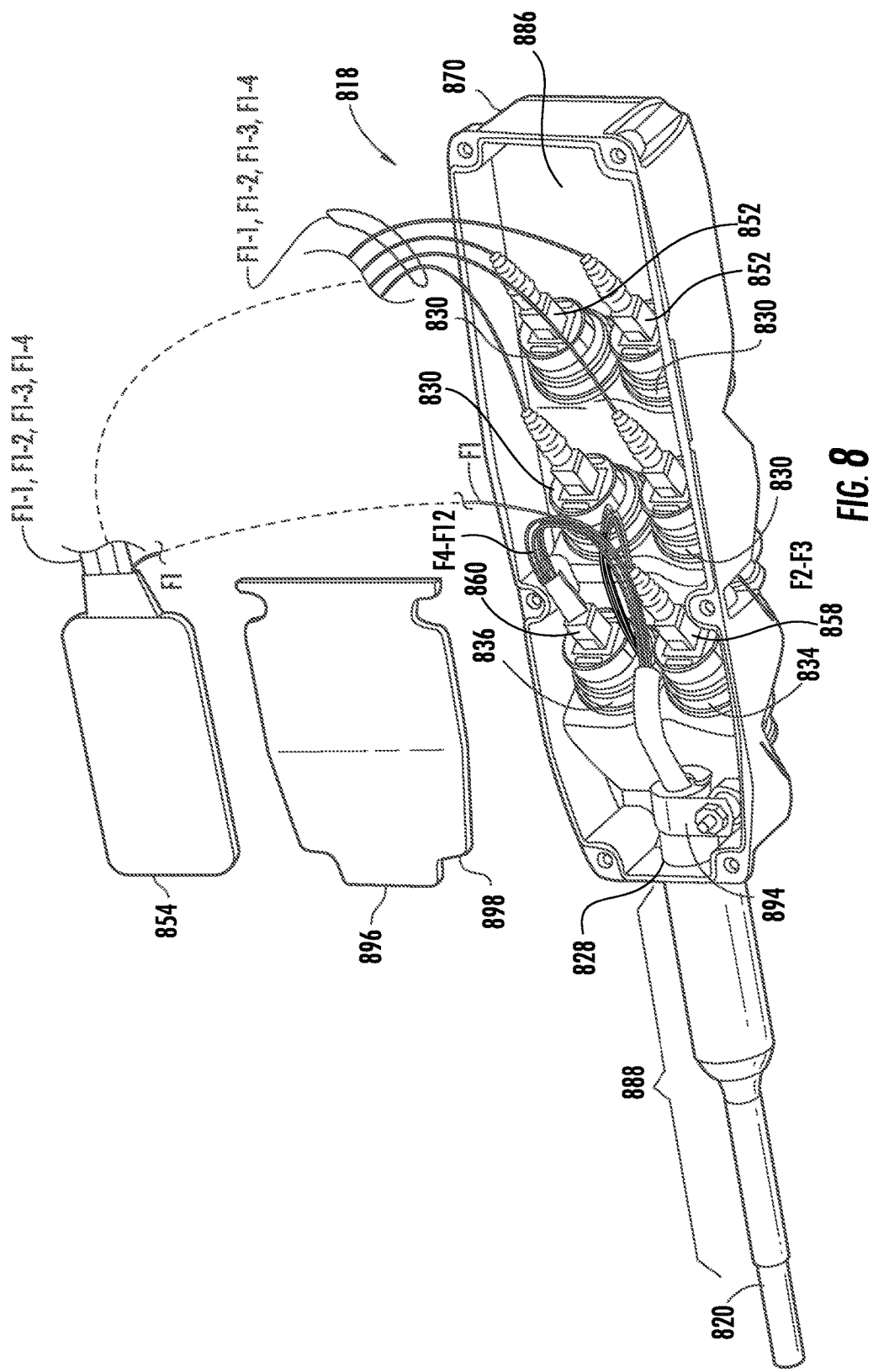
FIG. 8 is an internal perspective view of an alternative structure of a fiber optic connection terminal similar to the fiber optic connection terminal of FIG. 6, illustrating the predetermined routing of optical fibers based on a port mapping scheme, according to an embodiment.

In FIG. 8, another exemplary embodiment of a structure of a fiber optic connection terminal in accordance with the present invention is shown. In this embodiment, the fiber optic connection terminal 818 is similar to the fiber optic connection terminal 618 depicted in FIGS. 6 and 7, and, therefore, like components will not be discussed again with reference to FIG. 8. The fiber optic connection terminal 818 in FIG. 8 includes a splitter 854. Although only one splitter 854 is shown in this embodiment, it should be understood that the invention is not limited to one splitter 854 and multiple splitters 854 may be included. The splitter 854 may be mounted on a shelf 896 having at least one cutout 898. One or more fastening mechanisms 890 (not shown) may be used to affix the splitter 854 to the base 870 using the fastening mechanisms 890.

In this embodiment, the splitter 854 may be a 1×4 splitter in that one optical signal input to the splitter 854 may be split into four optical signals output from the splitter 854. It should be noted that since the optical signals may travel in both directions, the operation of the splitter 854 may be viewed from the reverse optical signal direction, in which case four optical signals input to the splitter 854 will be coupled into one optical signal output from the splitter 854. One optical fiber indicated in FIG. 8 as F1 from the twelve fiber branch cable 820 routes to and optically couples with the splitter 854, and the other optical fibers of the branch cable 820 route to the lateral multifiber port, similar to the lateral multifiber port 634 of FIGS. 6 and 7, and the expansion multifiber port 836, as described in detail above. Four first split optical fibers indicated in FIG. 8 as F1-1, F1-2, F1-3, and F1-4 are output from the splitter 854. Each of the first split optical fibers output from the splitter 854 may be pre-connectorized and routed to one or more drop ports 830. Further, as discussed above, more than one splitter 854 may be included in the fiber optic connection terminal 818, in which case, the optical fibers may route between the splitters 854 and the drop ports 830, lateral multifiber port(s) 834 and/or distribution multifiber port(s) 836 according to the port mapping scheme employed.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic distribution assembly comprising:
   a first fiber optic connector having a plurality of ports arranged in a predetermined port configuration having at least five port positions;
   a second fiber optic connector having a plurality of ports arranged in the predetermined port configuration;
   a third fiber optic connector having a plurality of ports arranged in the predetermined port configuration;
   a first optical fiber comprising N optical fibers, each first optical fiber comprising a first end optically coupled to the first fiber optic connector at one of port positions 1 through N of the predetermined port configuration;
   a plurality of second optical fibers comprising M optical fibers, wherein M is equal to at least (N+1), each second optical fiber comprising:
      a first end optically coupled to the first fiber optic connector at one of port positions (N+1) through (N+M) of the predetermined port configuration; and
      a second end optically coupled to the second fiber optic connector at one of port positions 1 through M of the predetermined port configuration; and
   a plurality of third optical fibers comprising P optical fibers, wherein P is equal to at least (N+1), each third optical fiber comprising:
      a first end optically coupled to the first fiber optic connector at one of port positions (N+M+1) through (N+M+P) of the predetermined port configuration; and
      a second end optically coupled to the third fiber optic connector at one of port positions 1 through P of the predetermined port configuration.

2. The fiber optic distribution assembly of claim 1, wherein the first fiber optic connector is an input fiber optic connector, the second fiber optic connector is a lateral fiber optic connector, and the third fiber optic connector is a distribution fiber optic connector.

3. The fiber optic distribution assembly of claim 1, wherein N equals one.

4. The fiber optic distribution assembly of claim 3, wherein M equals two.

5. The fiber optic distribution assembly of claim 4, wherein P equals nine.

6. The fiber optic distribution assembly of claim 1, wherein P is equal to at least (M+N+1).

7. The fiber optic distribution assembly of claim 1, wherein each first optical fiber has a second end terminating in a fiber optic splitter, the splitter having a plurality of outputs.

8. The fiber optic distribution assembly of claim 1, further comprising a terminal housing forming a housing interior, wherein the second fiber optic connector and the third fiber optic connector are disposed in the housing.

9. The fiber optic distribution assembly of claim 8, the terminal housing comprising a plurality of multifiber adapters, wherein the second fiber optic connector is connected to one of the plurality of multifiber adapters, and the third fiber optic connector is connected to one of the plurality of multifiber adapters.

10. The fiber optic distribution assembly of claim 9, wherein the first fiber optic connector is connected to one of the plurality of multifiber adapters.

11. The fiber optic distribution assembly of claim 9, further comprising a pigtail extending outside the housing through an opening in the housing, the pigtail comprising the first end of the first optical fiber, the first ends of the plurality of second optical fibers, and the first ends of the plurality of third optical fibers, the pigtail terminating in the first fiber optic connector.

12. A fiber optic distribution assembly comprising:
an input fiber optic connector having a plurality of ports arranged in a predetermined port configuration having at least five port positions;
a lateral fiber optic connector having a plurality of ports arranged in the predetermined port configuration;
a distribution fiber optic connector having a plurality of ports arranged in the predetermined port configuration;
a first optical fiber having a first end optically coupled to the input fiber optic connector at a first port position of the predetermined port configuration;
a second optical fiber having a first end optically coupled to the input fiber optic connector at a second port position of the predetermined port configuration and a second end optically coupled to the lateral fiber optic connector at the first port position of the predetermined port configuration;
a third optical fiber having a first end optically coupled to the input fiber optic connector at a third port position of the predetermined port configuration and a second end optically coupled to the lateral fiber optic connector at the second port position of the predetermined port configuration;
a fourth optical fiber having a first end optically coupled to the input fiber optic connector at a fourth port position of the predetermined port configuration and a second end optically coupled to the distribution fiber optic connector at the first port position of the predetermined port configuration; and
a fifth optical fiber having a first end optically coupled to the input fiber optic connector at a fifth port position of the predetermined port configuration and a second end optically coupled to the distribution fiber optic connector at the second port position of the predetermined port configuration.

13. The fiber optic distribution assembly of claim 12, further comprising:
a sixth optical fiber having a first end optically coupled to the first fiber optic connector at a sixth port position of the predetermined port configuration and a second end optically coupled to the distribution fiber optic connector at the third port position of the predetermined port configuration;
a seventh optical fiber having a first end optically coupled to the first fiber optic connector at a seventh port position of the predetermined port configuration and a second end optically coupled to the distribution fiber optic connector at the fourth port position of the predetermined port configuration;
an eighth optical fiber having a first end optically coupled to the first fiber optic connector at an eighth port position of the predetermined port configuration and a second end optically coupled to the distribution fiber optic connector at the fifth port position of the predetermined port configuration;
a ninth optical fiber having a first end optically coupled to the first fiber optic connector at a ninth port position of the predetermined port configuration and a second end optically coupled to the distribution fiber optic connector at the sixth port position of the predetermined port configuration;
a tenth optical fiber having a first end optically coupled to the first fiber optic connector at a tenth port position of the predetermined port configuration and a second end optically coupled to the distribution fiber optic connector at the seventh port position of the predetermined port configuration;
an eleventh optical fiber having a first end optically coupled to the first fiber optic connector at an eleventh port position of the predetermined port configuration and a second end optically coupled to the distribution fiber optic connector at the eighth port position of the predetermined port configuration; and
a twelfth optical fiber having a first end optically coupled to the first fiber optic connector at a twelfth port position of the predetermined port configuration and a second end optically coupled to the distribution fiber optic connector at the ninth port position of the predetermined port configuration.

14. The fiber optic distribution assembly of claim 13, wherein each first optical fiber has a second end terminating in a fiber optic splitter, the splitter having a plurality of outputs.

15. The fiber optic distribution assembly of claim 13, further comprising a terminal housing forming a housing interior, wherein the second fiber optic connector and the third fiber optic connector are disposed in the housing.

16. The fiber optic distribution assembly of claim 15, the terminal housing comprising a plurality of multifiber adapters, wherein the second fiber optic connector is connected to one of the plurality of multifiber adapters, and the third fiber optic connector is connected to one of the plurality of multifiber adapters.

17. The fiber optic distribution assembly of claim 16, wherein the first fiber optic connector is connected to one of the plurality of multifiber adapters.

18. The fiber optic distribution assembly of claim 17, further comprising a pigtail extending outside the housing through an opening in the housing, the pigtail comprising the first end of the first optical fiber, the first ends of the plurality of second optical fibers, and the first ends of the plurality of third optical fibers, the pigtail terminating in the first fiber optic connector.

19. A method of assembling a fiber optic distribution assembly, the method comprising:

providing a first fiber optic connector having a plurality of ports arranged in a predetermined port configuration having at least five port positions;

optically coupling a first end of each of N first optical fibers to one of port positions 1 through N of predetermined port configuration of the first fiber optic connector, wherein N is equal to one or more;

optically coupling a first end of each of a plurality of M second optical fibers to one of port positions (N+1) through (N+M) of the predetermined port configuration of the first fiber optic connector, wherein M is equal to at least (N+1);

optically coupling a first end of each of a plurality of P third optical fibers to one of port positions (N+M+1) through (N+M+P) of the predetermined port configuration of the first fiber optic connector, wherein P is equal to at least (N+1);

providing a second fiber optic connector having a plurality of ports arranged in the predetermined port configuration;

optically coupling a second end of each of the plurality of M second optical fibers to one of port positions 1 through M of the predetermined port configuration of the second fiber optic connector;

providing a third fiber optic connector having a plurality of ports arranged in the predetermined port configuration; and optically coupling a second end of each of the plurality of P third optical fibers to one of port positions 1 through P of the predetermined port configuration of the third fiber optic connector.

20. A network system for a fiber optic distribution network, the network system comprising:

a plurality of fiber optic distribution assemblies, each fiber optic distribution assembly comprising:

a first fiber optic connector having a plurality of ports arranged in a predetermined port configuration having at least five port positions;

a second fiber optic connector having a plurality of ports arranged in the predetermined port configuration;

a third fiber optic connector having a plurality of ports arranged in the predetermined port configuration;

wherein the plurality of fiber optic distribution assemblies comprises:

a first fiber optic distribution assembly optically coupled to a distribution cable via the first multifiber connector of the first fiber optic distribution assembly;

a second fiber optic distribution assembly optically coupled to the second multifiber connector of the first fiber optic distribution assembly via the first multifiber connector of the second fiber optic distribution assembly;

a third fiber optic distribution assembly optically coupled to the second multifiber connector of the second fiber optic distribution assembly via the first multifiber connector of the third fiber optic distribution assembly;

a fourth fiber optic distribution assembly optically coupled to the third multifiber connector of the first fiber optic distribution assembly via the first multifiber connector of the fourth fiber optic distribution assembly; and a fifth fiber optic distribution assembly optically coupled to the fourth multifiber connector of the first fiber optic distribution assembly via the first multifiber connector of the fifth fiber optic distribution assembly.

* * * * *